(12) United States Patent
Galley et al.

(10) Patent No.: US 7,978,086 B2
(45) Date of Patent: Jul. 12, 2011

(54) METHOD AND DEVICE FOR RECOGNIZING TIREDNESS

(75) Inventors: Lars Galley, Dettenhausen (DE); Elisabeth Hendrika Hentschel, Magstadt (DE); Klaus-Peter Kuhn, Pluederhausen (DE); Wolfgang Stolzmann, Dissen (DE)

(73) Assignee: Daimler AG, Stuttgart (DE)

( * ) Notice: Subject to any disclaimer, the term of this patent is extended or adjusted under 35 U.S.C. 154(b) by 654 days.

(21) Appl. No.: 11/916,883

(22) PCT Filed: Jun. 1, 2006

(86) PCT No.: PCT/EP2006/005212
§ 371 (c)(1),
(2), (4) Date: Jul. 9, 2008

(87) PCT Pub. No.: WO2006/131254
PCT Pub. Date: Dec. 14, 2006

(65) Prior Publication Data
US 2009/0021356 A1    Jan. 22, 2009

(30) Foreign Application Priority Data
Jun. 9, 2005 (DE) .................. 10 2005 026 456

(51) Int. Cl.
*G08B 23/00* (2006.01)
(52) U.S. Cl. ............... 340/576; 340/425.5; 340/439
(58) Field of Classification Search ........... 340/576, 340/575, 439, 438, 425.5, 426.31, 571.1; 180/272; 701/29, 41
See application file for complete search history.

(56) References Cited

U.S. PATENT DOCUMENTS

| 4,594,583 | A | 6/1986 | Seko et al. |
| 5,745,031 | A | 4/1998 | Yamamoto |
| 6,756,903 | B2 * | 6/2004 | Omry et al. ............. 340/576 |
| 7,190,274 | B2 * | 3/2007 | Ihara et al. ............. 340/575 |
| 7,427,924 | B2 * | 9/2008 | Ferrone et al. .......... 340/576 |
| 7,455,146 | B2 * | 11/2008 | Brosig et al. ........... 180/272 |
| 7,551,093 | B2 * | 6/2009 | Maass ................... 340/576 |
| 2009/0132109 | A1 | 5/2009 | Galley et al. |
| 2009/0160631 | A1 | 6/2009 | Galley et al. |

FOREIGN PATENT DOCUMENTS

| DE | 195 15 429 A1 | 12/1995 |
| DE | 102 38 324 A1 | 4/2004 |
| DE | 103 55 221 A1 | 6/2005 |
| EP | 0 147 539 A2 | 7/1985 |
| JP | 07093678 A | 4/1995 |
| WO | WO 2005/059857 A1 | 6/2005 |

OTHER PUBLICATIONS

International Search Report dated Sep. 13, 2006 with an English translation of the pertinent portions (Four (4) pages).
German Office Action dated Nov. 29, 2006 with an English translation of the pertinent portions (Seven (7) pages).
Forms PCT/ISA/220 and PCT/ISA/237 dated Sep. 13, 2006 with an English translation of the pertinent portions (Ten (10) pages).

* cited by examiner

*Primary Examiner* — Toan N Pham
(74) *Attorney, Agent, or Firm* — Crowell & Moring LLP

(57) ABSTRACT

In a method and in a device for detecting when the driver of a motor vehicle becomes tired, the tiredness is determined as a function of a detected steering inactivity phase and a subsequent steering action. In this context, the steering inactivity phase is logically combined with the steering action, and the logic combination is stored at various times. The logic combination is stored with an assigned weighting factor, and the weighting factor is determined as a function of a classification of a steering situation.

22 Claims, 4 Drawing Sheets

METHOD AND DEVICE FOR RECOGNIZING TIREDNESS

BACKGROUND AND SUMMARY OF THE INVENTION

This invention relates to a method and a device for detecting when the driver of a motor vehicle becomes tired while the vehicle is operating.

Japanese document JP 07 093 678 A discloses a method for detecting tiredness of the driver of a vehicle, in which a steering action that follows a steering inactivity phase is sought.

U.S. Pat. No. 4,594,583 discloses a method for detecting tiredness and for warning drivers in which a steering inactivity phase and a subsequent steering action are detected, and the driver is subsequently warned. This warning can be suppressed through the observation of a further vehicle operating parameter.

The object of the invention is to provide a method and a device which ensure reliable detection of the tiredness of a driver of a vehicle.

This object is achieved by means of the features of the invention claimed.

The method according to the invention detects tiredness of the driver of the vehicle when a steering inactivity phase and a subsequent steering action are detected. The implementation of the steering inactivity phase is logically combined with the steering action. For this purpose, the movement of a steering wheel of the vehicle is sensed in the form of the steering wheel angle x. A sensor for sensing the steering wheel angle is usually present in any case in modern vehicles. A steering inactivity phase is sensed when the steering wheel angle remains within a steering wheel angle interval $\Delta X$ during a predetermined time interval. The subsequent steering action and the magnitude of the implementation of the steering action are sensed in the form of the maximum gradient of the steering wheel angle, that is to say for example the steering wheel angle speed, which occurs then. Tiredness of the driver is advantageously detected only if the steering wheel angle remains within the predetermined steering wheel angle interval during a specific time period and the time period exceeds a predetermined threshold value and at the same time a steering wheel action which is sensed after this exceeds a predetermined value of the maximum steering wheel angle gradient in terms of its implementation.

At times Ti, the implementation of the steering inactivity phase is logically combined with the implementation of the steering action, stored, and provided with a weighting factor, which is also stored. This logic combination and storage, together with weighting factors, are carried out repeatedly so that the logic combination and storage and weighting take place at the various times Ti during a time interval. In each case, a mathematical mean value of the stored values is formed at the times Ti at the end of a further time interval. In this context, an arithmetical mean value is preferably formed.

The inclusion of what are referred to as secondary factors in the weighting factor is particularly advantageous. A steering situation is determined for this purpose. In order to acquire a steering situation at the times Ti, a classification of the steering situations is carried out by means of data from a plurality of sensors in the vehicle and/or by means of data relating to operator control interventions in the vehicle. It is particularly advantageous here that the data which is used from the plurality of sensors in the vehicle and/or the data relating to operator control interventions in the vehicle is usually present in any case in an accessible form on the data bus in modern vehicles. The classification of the steering situation makes it possible to divide the steering situations into a plurality of classes which characterize the type of the steering situation in more detail. It is, for example, particularly advantageous to provide, in the classification of the steering situation, a tiredness-induced steering situation, a distraction-induced steering situation, and an environment-induced steering situation. The weighting factor in distraction-induced steering situations and in environment-induced steering situations is advantageously lower here than in tiredness-induced steering situations.

This provides the advantage that assignment of a steering action to a tiredness-induced steering action is improved. Steering events are in fact always gated out or weighted less strongly if it is proven to a conditional degree by the steering situation that it is distraction-induced or environment-induced.

Distraction-induced steering events occur, for example, if, in a time interval around the steering event, the flashing indicator light, the cruise controller lever, the headlights, the horn, the wiper, the voice-control lever, the steering wheel pushbutton keys, the steering column adjustment, the operator control unit, the air-conditioning system or the like is activated. Steering events which occur in the steering situation are then either completely gated out or weighted less strongly. The classification of the steering situations permits weighting according to the severity of the distraction. In a similar way it is possible to detect an environment-induced steering situation. Side wind, aquaplaning, the limiting range of the vehicle movement dynamics or the like can force the driver to carry out steering maneuvers which could initially be assigned to patterns of tired or inattentive drivers. Here, the detection of the environment-induced steering situation is important. In order to detect such a steering situation it is possible to have recourse to further vehicle sensors.

It is particularly advantageous to provide a further gradation of the weighting, corresponding to the severity of the distraction, within one class of steering situations. For example, the adjustment of the volume of the radio is to be given a less strong weighting than the inputting of a navigation destination.

Through the weighting and, if appropriate, the exclusion of individual steering maneuvers, the invention permits more reliable detection of tiredness or inattentiveness and permits incorrect events to be eliminated. Both the detection of inattentiveness and the detection of tiredness are improved. In particular, steering actions which are induced by the outside are eliminated. The elimination and weighting of operator control actions enable tiredness events to be separated from inattentiveness events. This permits both tiredness and inattentiveness to be detected.

The abovementioned object of the invention is also achieved by means of a control unit for carrying out the described method. The advantages of this solution correspond to the advantages mentioned with respect to the described method.

DETAILED DESCRIPTION OF THE INVENTION

Figure 1:
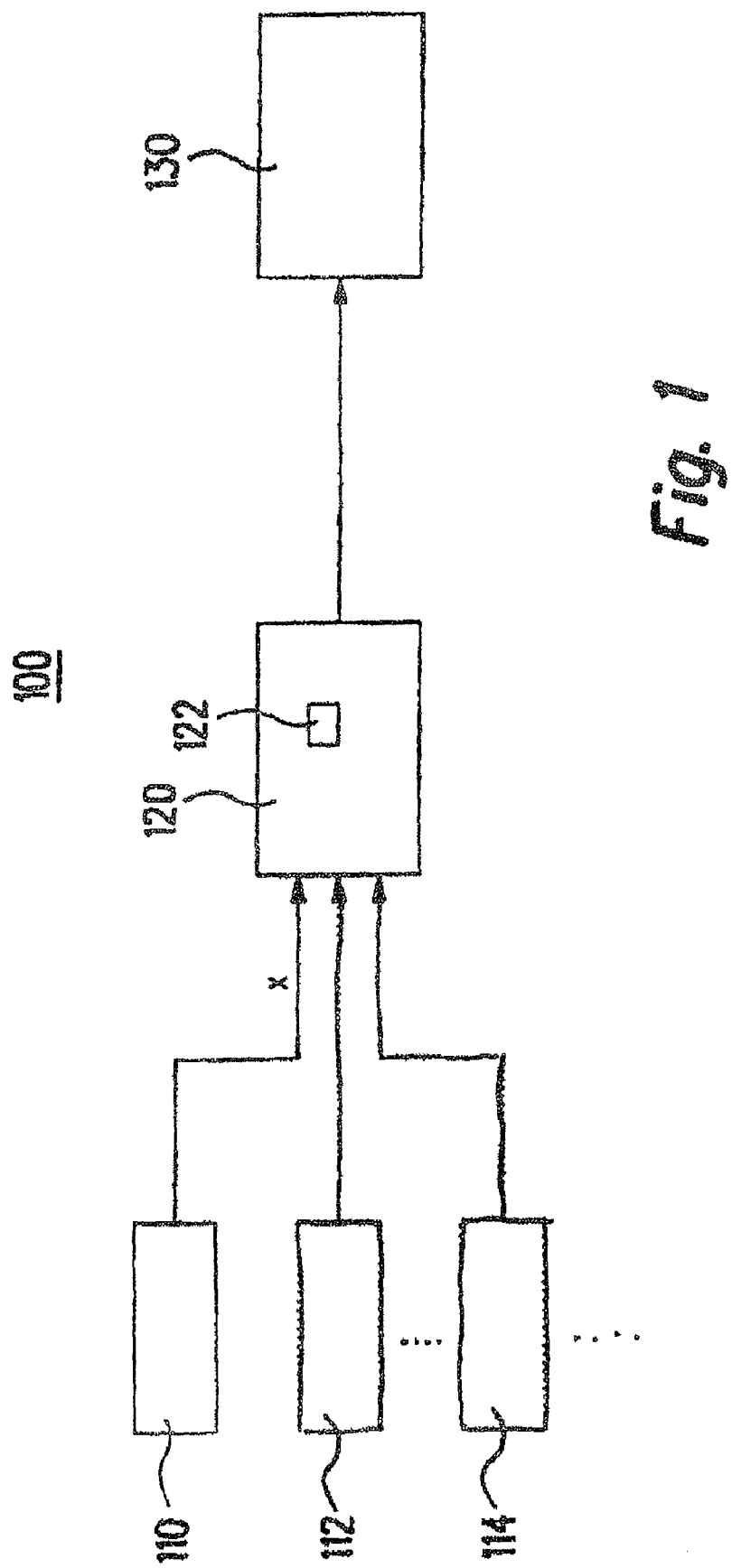
FIG. 1 shows a control unit according to the invention.

FIG. 1 shows a control unit 100 for carrying out the method according to the invention for detecting inattentiveness and/or tiredness of the driver of a motor vehicle. The control unit is preferably mounted in a vehicle and comprises a steering wheel angle sensor 110 for sensing the current steering wheel angle x, that is to say the steering movement, caused by the driver. Furthermore, the control unit 100 comprises a control device 120 which is preferably embodied as a microcontroller. The control device 120 senses a sensor signal which is generated by the steering wheel angle sensor 110 and represents the steering wheel angle x.

The steering wheel angle x represents an indicator of tiredness of the driver which is advantageously preferred. In addition to the steering wheel angle, the control device 120 also receives further sensor signals from other sensors, represented as 112 to 114 in the figure by way of example, as further indicators of the tiredness of the driver. The control device evaluates the sensor signals of the other sensors 112 to 114 as further indicators of the tiredness of the driver. The sensor signals of the other sensors, for example 112 to 114, can advantageously be received via a bus system for the control device. In modern vehicles, such bus systems, which may be composed, for example, of a CAN or Most bus, are present in any case. The received and evaluated sensor signals are preferably already present on the data bus of the vehicle in any case. It is thus not necessary to provide additional sensors which permit the detection of tiredness and/or inattentiveness to be improved.

In order to detect inattentiveness and/or tiredness of the driver, a computer program 122 runs on the control device 120 and detects the tiredness in accordance with an inventive method which is described below. The detection is advantageously carried out by evaluating the steering wheel angle x as a preferred indicator. If it is detected that the driver is tired, it is advantageous if the control device 120 actuates a warning device 130 so that the latter outputs an acoustic or visual warning message to the driver. The warning message makes the driver aware of his behavior while he is driving the vehicle and gives him occasion to become attentive again.

Figure 2:
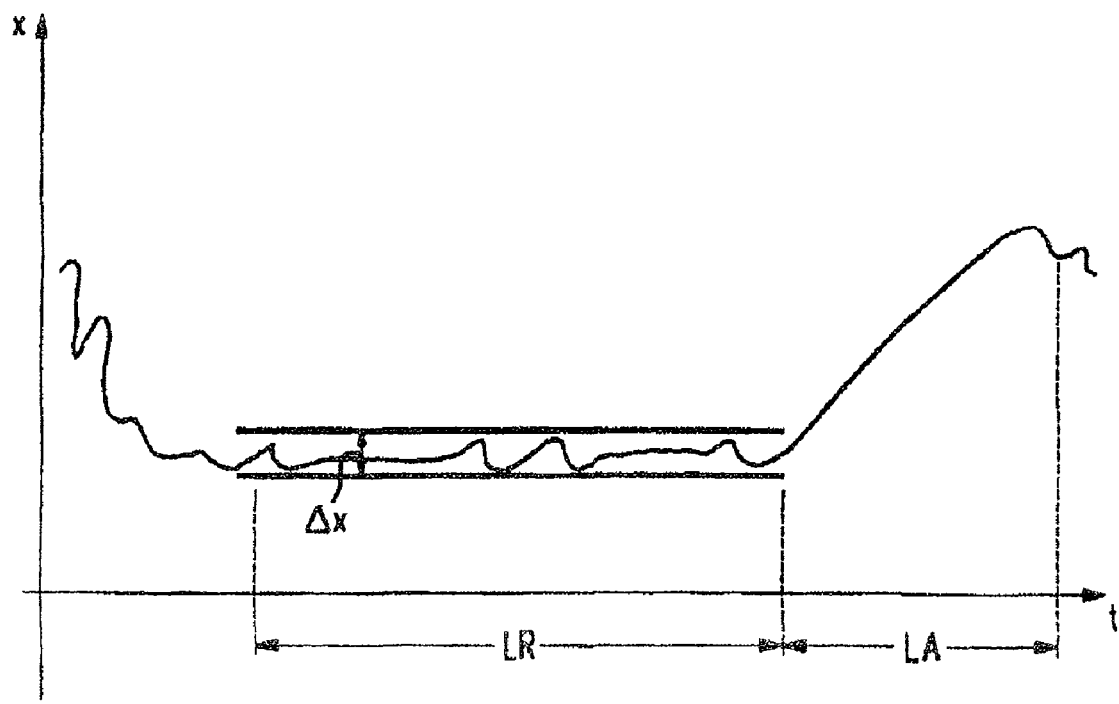
FIG. 2 shows an example of the profile of the steering wheel angle x when the driver is tired in accordance with the invention.

FIG. 2 shows a typical profile of the steering wheel angle in the form in which it is present if it is detected, using the steering wheel angle, that the driver is inattentive or tired. This profile is typical of an inattentive and/or tired driver in so far as it firstly has a steering inactivity phase LR in which it does not change significantly. In FIG. 2, the steering angle x remains during the steering inactivity phase LR in the deflection range Δx which is bounded by the two parallel horizontal lines. The very strong or violent steering action which follows this steering inactivity phase is characteristic of the presence of tiredness. This violent steering action LA is represented in FIG. 2 via the steep rise in the steering angle x at the end of the inactivity phase.

Figure 3:
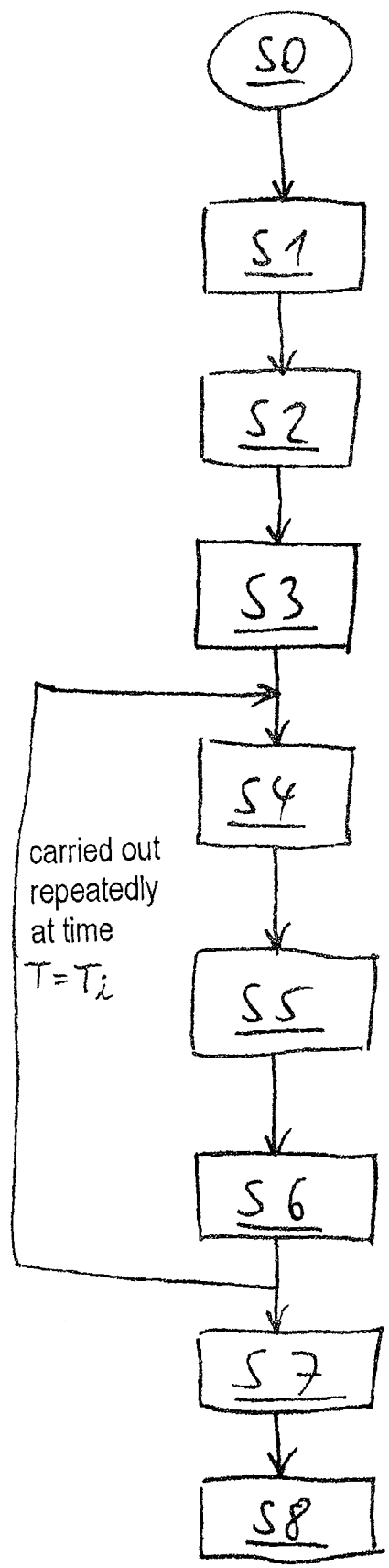
FIG. 3 shows the profile of an advantageous exemplary embodiment of the method according to the invention.

FIG. 3 illustrates the inventive method which is implemented using the control unit 100 described above. The method steps S0 to S8 shown in FIG. 3 represent this method.

After a starting step S0, the method according to FIG. 3 firstly provides for a steering movement of the steering wheel of the vehicle to be sensed, that is to say the steering behavior is sensed in the form of the steering wheel angle x (method step S1). On the basis of the sensed steering wheel angle x, the steering inactivity phase LR is then detected in a second step S2, see FIG. 2. Typical steering behavior in the case of inattentiveness and/or tiredness is distinguished, as already mentioned above with reference to FIG. 2, by a first steering inactivity phase LR without or with only a small degree of steering activity and by a subsequent second steering action phase LA with overproportionally violent steering movements. In this context, the implementation of a steering inactivity phase is detected in method step S2. The implementation of the steering inactivity phase is in particular its duration. A steering inactivity phase occurs for as long as the steering angle of the vehicle is within the predetermined steering wheel angle interval ΔX, cf. FIG. 2. The period of time for which this situation lasts then represents the implementation of the steering inactivity phase LR.

In the following method step S3, the implementation of a steering action which follows the detected steering inactivity phase is detected. For this purpose, the maximum gradient of the steering angle which occurs then is detected. In FIG. 2, this gradient is illustrated in the form of the positive gradient of the steering angle such as occurs after the steering wheel angle has left the steering wheel angle interval ΔX.

In method step S4, the implementation of the steering inactivity phase and the implementation of the steering action are then logically combined with one another at a time Ti. The logic combination is stored in method step S5. In method step S6, a weighting factor is stored together with the logic combination.

The logic combination of the two aforementioned implementations of the steering inactivity phase and the steering action is preferably carried out only if it has become apparent in the previously carried-out method steps S1 to S3 that the implementation of the steering inactivity phase in the form of its duration is longer than a predetermined minimum duration and the maximum gradient of the steering wheel angle exceeds a predetermined gradient threshold value. Otherwise, the implementations of the steering inactivity phase and the steering actions are not considered by the method to be sufficiently strongly implemented in order to be able to infer, from their combined presence, that the driver is tired.

According to the invention, the steps S4, S5 and S6 are repeatedly carried out in each case at times Ti. This leads to the logic combination results of the implementation of the steering inactivity phase with the implementation of the steering action to be stored, provided with weighting factors, at the times Ti in each case. The repeated execution of the calculation of the logic combination results and their weighting at various times Ti with i=[1, 2, . . . I) during the measuring time interval leads to a situation in which preferably a large number of logic combination results are available at the end of the measuring time interval.

The individual weighting of the logic combination results occurs in method step S6. Each of these results is assigned a weighting factor. These weighting factors represent the class of the respective steering situation of the vehicle, in each case at the time to which the logic combination result refers. In method step S7, a weighted logic combination result is then finally calculated by mathematical, preferably arithmetically weighted, formation of mean values of the logic combination results acquired during the measuring time interval, taking into account their assigned weighting factors.

The weighted result of the logic combination constitutes a very reliable measure, which above all can be implemented relatively easily and quickly, of the severity of the inattentiveness and/or tiredness of the driver while he is driving the vehicle. This averaged result of the logic combination is then preferably subjected to a fault criterion in method step S8 and evaluated in order to generate a warning signal to the driver. This fault criterion is met, for example, if the arithmetical mean of all the logic combination results calculated over a preceding time period, respectively weighted with their individual weighting factors, exceeds a predefined threshold value.

Figure 4:
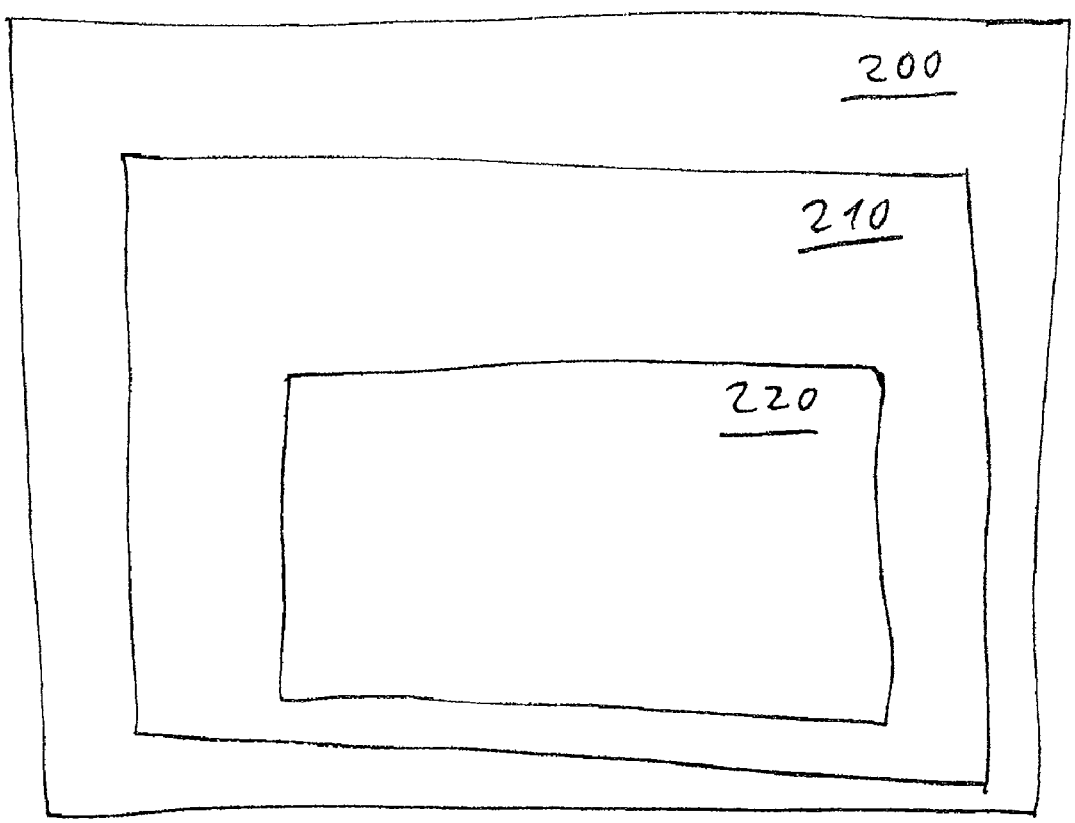
FIG. 4 shows the representation of the event subsets of the steering events.

FIG. 4 is a schematic illustration of the division of all the steering events. The set of the steering events with the reference number 200 comprises all the steering events including the external excitation, for example side wind, aquaplaning, the limiting range of the vehicle movement dynamics, etc. The subset of all the steering events with the reference symbol 210 comprises the steering events which are caused due to inattentiveness and/or tiredness. It comprises those steering events which are caused, for example, by operator control actions and/or secondary tasks of the driver, that is to say relate to distraction-induced steering events. The subset of the steering events with the reference number 220 comprises the steering events which are caused by tiredness. These steering events can be weighted, for example, using the time of day, duration of a journey or further parameters.

As is apparent from FIG. 4, the steering events with the reference number 200 comprise the three steering situations of distraction-induced steering situation, environment-induced steering situation and tiredness-induced steering situation. The steering events with the reference number 210 comprise the distraction-induced steering situation and the tiredness-induced steering situation. The steering events with the reference number 220 comprise only the tiredness-induced steering situation.

The weighting of steering actions at the times Ti is then carried out as a function of which steering situation is present at the time Ti. The weighting factor is preferably larger if a tiredness-induced steering situation is present. This is the case if steering events from the set with the reference number 220 occur. In the case of steering events which are a component of the set of steering events with the reference number 210 but do not belong to this set with the steering events with the reference number 220, a distraction-induced steering situation is present. The weighting factor at the time Ti will advantageously be lower in the event of a distraction-induced steering situation than in the event of a tiredness-induced steering situation.

A distraction-induced steering situation is detected by means of the evaluation of data relating to operator control interventions in the vehicle. If, for example, the flashing indicator light, the cruise controller lever, the headlight, the horn, the wiper, the voice-control lever, the steering wheel pushbutton keys, the steering column adjustment, the navigation system, the radio, the air-conditioning system or the like is activated in a time interval around the steering event, the steering situation is classified as a distraction-induced steering situation. These steering events of the steering situation of the class of distraction-induced steering situation are then weighted in such a way that they are either completely gated out or weighted less strongly. In addition, within the class of distraction-induced steering events the severity of distraction is weighted. This is done by classifying the severity of distraction within the class of the distraction-induced steering situation. Therefore, for example, the adjustment of the volume of the radio is to be weighted less strongly than the inputting of a navigation destination. In modern vehicles, data relating to operator control interventions is present in any case, as a signal on existing data buses. These signals are analyzed for their effects on the inattentiveness or tiredness. This leads to a situation in which the invention can be implemented in the vehicle at low cost.

During the classification of the severity of distraction within the class of distraction-induced steering situations, it is advantageous to place the operator control actions in a relatively large context. For example, the activation of the flashing indicator light considered in itself is generally a highly automated activity which is part of the primary driving function. For this reason, as a rule it is to be given a very low weighting. In conjunction with a relatively high speed of the vehicle, the activation of the flashing indicator light becomes an indicator of an overtaking maneuver and thus an indication of a complex driving situation. In addition, this situation is characterized by a steering maneuver in which the driver may also intentionally drive in a somewhat angular fashion. The steering peaks therefore cannot be assigned to tiredness or inattentiveness.

The classification of an environment-induced steering situation is carried out if environment-induced events are detected. Side wind, aquaplaning, the limiting range of the vehicle movement dynamics and so on can force the driver to carry out steering maneuvers which could initially be assigned to the patterns of tired or inattentive drivers. The invention permits reliable detection of an environment-induced steering situation here.

For example, in the case of side wind it is possible to calculate a transverse acceleration equivalent from the steering wheel angle signal by means of the kinematic relationships of the vehicle. After offset and phase correction, the signal profile can be compared with the transverse acceleration which is measured by sensor. In normal driving situations, both signals are congruent in a certain tolerance band and a steering action precedes the transverse acceleration reaction of the driver. If it is then possible firstly to detect a signal deviation in the transverse acceleration sensor which is followed by a steering reaction, it is possible to infer that a gust of side wind has occurred. Since as a rule only the gusts which can lead to the steering event of the detection of tiredness to occur are of interest, and not a constant side wind, the detection is advantageously possible here without further measuring variables and thus at low cost.

In order to detect aquaplaning, it is possible, for example, to examine the wheel speeds. In this context, the signal fluctuations and dips in rotational speed of the individual wheels are considered. The ratios between the wheels can also be important since aquaplaning often occurs only on one side of the vehicle, which can lead to the steering reactions which are important here. Using the wheel speed sensors it is therefore possible here to detect a further important environment-induced steering situation. A further example of the detection of an environment-induced steering situation is the detection of a limiting range of the vehicle movement dynamics. This is detected, for example, in the vehicle movement dynamics controller and is used as an exclusion criterion, by the criteria for side wind and aquaplaning. This means that the detection of a limiting range of the vehicle movement dynamics leads to an environment-induced steering situation being detected, and therefore neither a tiredness-induced nor a distraction-induced steering situation is present. This leads to a low weighting of the steering event at this time or to gating out of this steering event at this time.

With the above-described examples of detected environment-induced faults it is then possible to carry out the weighting of the steering events for the defined time. The time period which is considered around a steering event can be several seconds, for example, in the case of switch activations and extend, for example, over several minutes in the case of relatively complex activities. In one advantageous embodiment of the invention, in addition to the start of a fault its end is also detected and the time period of the adaptation of the weighting is coupled thereto.

The weighting factor is advantageously as base 1 and can, if appropriate, be reduced to 0.

Certain tiredness-induced steering situations can be detected by means of a particular class of operator control interventions. Such an operator control action occurs, for example, if the temperature of the air-conditioning system is significantly lowered. A further example of such an operator control action can be increasing the air throughput rate, which can be carried out, for example, by means of the blower and/or by opening the windows and by opening the sunroof. In these situations it is advantageously possible to increase the weighting of steering events since the driver himself already takes measures against tiredness. In this case, the steering situation is therefore classified as a tiredness-induced steering situation. This is carried out on the basis of data relating to operator control interventions in the vehicle.

The time of day and the duration of a journey can also influence the driving performance. In the case of the time of day, steering errors are, for example, correspondingly given a higher weighting at night or to a lesser degree in the afternoon than at other times of day.

The weighting can also be higher than 1 here. As the duration of a journey increases, steering events can correspondingly also be given a higher weighting. Here too, it is possible to allow the weighting to increase above 1.

The method according to the invention is preferably implemented in the form of at least one computer program. The computer program can, if appropriate, be stored together with further computer programs on a data carrier. The data carrier can be a diskette, a compact disk, what is referred to as a flash memory or the like. The computer program which is stored on the data carrier can then be sold as a product to a customer. As an alternative to transmission by data carrier, transmission over a communications network, in particular the Internet, is also possible.

The invention claimed is:

1. A method for detecting when the driver of a vehicle is tired, the tiredness being determined as a function of a steering inactivity phase and a subsequent steering action, the steering inactivity phase being logically combined with the steering action, comprising:
sensing a movement of a steering wheel of the vehicle,
detecting a steering action that follows the steering inactivity phase,
acquiring a magnitude to which the steering action is implemented from a steering wheel angle gradient,
determining at least one factor based on at least one steering situation, and
evaluating said at least one factor in order to generate an appropriate warning signal.

2. The method as claimed in claim 1, wherein said movement of the steering wheel is sensed in the form of a steering wheel angle.

3. The method as claimed in claim 2, wherein a steering inactivity phase is detected and a magnitude of implementation of the steering inactivity phase is acquired as a time period during which the steering wheel angle remains within a predetermined steering wheel angle interval.

4. The method as claimed in claim 2, wherein a logic combination of implementation of the steering inactivity phase and implementation of the steering action occur at different times during a predetermined measuring time interval.

5. The method as claimed in claim 2, wherein the steering situation is classified at various times by way of data from a plurality of sensors in the vehicle, by way of data relating to operator control interventions in the vehicle, or by way of both data types.

6. The method as claimed in claim 1, wherein a steering inactivity phase is detected and a magnitude of implementation of the steering inactivity phase is acquired as a time period during which the steering wheel angle remains within a predetermined steering wheel angle interval.

7. The method as claimed in claim 6, wherein a logic combination of implementation of the steering inactivity phase and implementation of the steering action occur at different times during a predetermined measuring time interval.

8. The method as claimed in claim 1, wherein the magnitude to which the steering action is implemented is acquired from the maximum steering wheel angle gradient that occurs.

9. The method as claimed in claim 8, wherein a logic combination of implementation of the steering inactivity phase and implementation of the steering action occur at different times during a predetermined measuring time interval.

10. The method as claimed in claim 1, wherein a logic combination of implementation of the steering inactivity phase and implementation of the steering action occur at different times during a predetermined measuring time interval.

11. The method as claimed in claim 1, wherein the steering situation is classified at various times by way of data from a plurality of sensors in the vehicle, by way of data relating to operator control interventions in the vehicle, or by way of both data types.

12. The method as claimed in claim 1, wherein calculation of a weighted result of the logic combination is carried out by mathematical formation of mean values of results stored during the measuring time interval, taking into account assigned weighting factors.

13. The method as claimed in claim 12, wherein the mathematical formation is an arithmetic formation.

14. The method as claimed in claim 1, wherein the logic combination is carried out at times when the duration of the steering inactivity phase implemented is longer than a predetermined minimum duration, and the maximum gradient of the steering wheel angle exceeds a predetermined gradient threshold value.

15. The method as claimed in claim 1, wherein the steering situation is classified into any of three classes of steering situations.

16. The method as claimed in claim 15, wherein the steering situation is identified and classified in at least one of tiredness-induced steering situations, distraction-induced steering situations, and environment-induced steering situations.

17. The method as claimed in claim 16, wherein the weighting factor in distraction-induced steering situations and in environment-induced steering situations is lower than that in tiredness-induced steering situations.

18. A method for detecting when the driver of a vehicle is tired, the tiredness being determined as a function of a steering inactivity phase and a subsequent steering action, the steering inactivity phase being logically combined with the steering action, comprising:
determining a weighting factor as a function of a classification of a steering situation during which the steering action is executed, and
storing the logic combination at various times with an assigned weighting factor, wherein a movement of a steering wheel of the vehicle is sensed in the form of a steering wheel angle, and wherein a steering action that follows the steering inactivity phase is detected and a magnitude of implementation of the steering action is acquired in the form of the maximum gradient of the steering wheel angle that then occurs.

19. A method for detecting when the driver of a vehicle is tired, the tiredness being determined as a function of a steering inactivity phase and a subsequent steering action, the steering inactivity phase being logically combined with the steering action, comprising:

determining a weighting factor as a function of a classification of a steering situation during which the steering action is executed, and storing the logic combination at various times with an assigned weighting factor, wherein a steering inactivity phase is detected and a magnitude of implementation of the steering inactivity phase is acquired as a time period during which the steering wheel angle remains within a predetermined steering wheel angle interval, and wherein a steering action that follows the steering inactivity phase is detected and a magnitude of implementation of the steering action is acquired in the form of the maximum gradient of the steering wheel angle that then occurs.

20. A control unit for performing a method for detecting when the driver of a vehicle is tired as defined by claim 1.

21. A method for detecting when the driver of a vehicle is tired, the tiredness being determined as a function of a steering inactivity phase and a subsequent steering action, the steering inactivity phase being logically combined with the steering action, comprising:

determining at least one factor based on at least one steering situation, and evaluating said at least one factor in order to generate an appropriate warning signal, wherein a movement of a steering wheel of the vehicle is sensed in the form of a steering wheel angle, and wherein a steering action that follows the steering inactivity phase is detected and a magnitude of implementation of the steering action is acquired in the form of the maximum gradient of the steering wheel angle that then occurs.

22. A method for detecting when the driver of a vehicle is tired, the tiredness being determined as a function of a steering inactivity phase and a subsequent steering action, the steering inactivity phase being logically combined with the steering action, comprising:

determining at least one factor based on at least one steering situation, and evaluating said at least one factor in order to generate an appropriate warning signal, wherein a steering inactivity phase is detected and a magnitude of implementation of the steering inactivity phase is acquired as a time period during which the steering wheel angle remains within a predetermined steering wheel angle interval, and wherein a steering action that follows the steering inactivity phase is detected and a magnitude of implementation of the steering action is acquired in the form of the maximum gradient of the steering wheel angle that then occurs.

* * * * *